Dec. 25, 1934.     M. I. BRADLEY     1,985,278
UNIVERSAL JOINT
Filed Nov. 4, 1932     2 Sheets-Sheet 1

INVENTOR
Merrill I. Bradley.
BY
Harness, Dickey, Pierce & Hann.
ATTORNEYS.

Dec. 25, 1934.  M. I. BRADLEY  1,985,278
UNIVERSAL JOINT
Filed Nov. 4, 1932   2 Sheets-Sheet 2
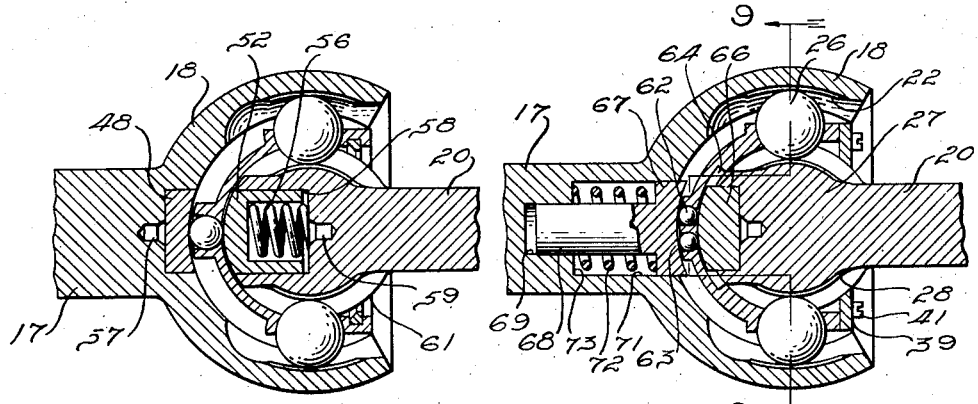
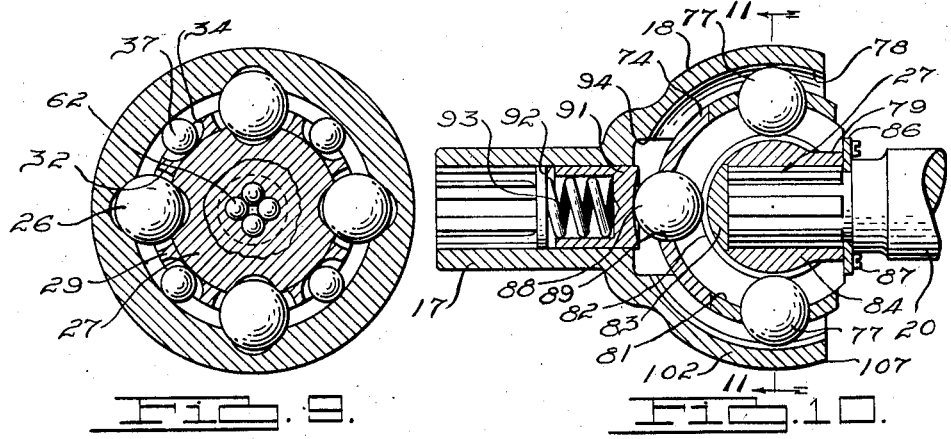
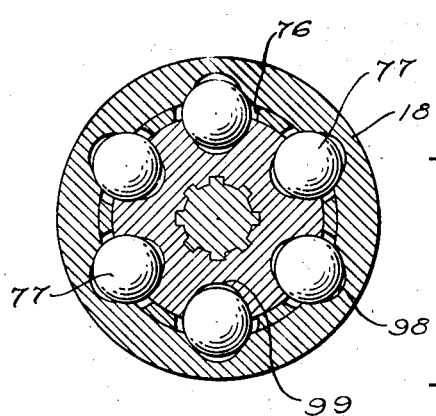
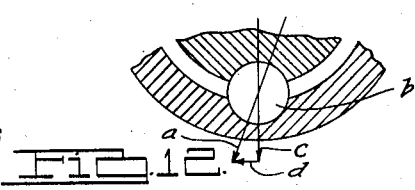
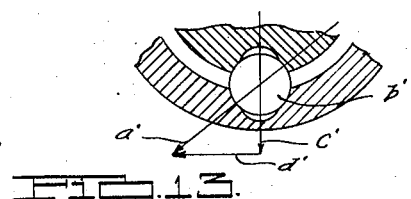
INVENTOR
Merrill I. Bradley.
BY
Hainess, Dickey, Pierce & Hann.
ATTORNEYS.

Patented Dec. 25, 1934

1,985,278

UNITED STATES PATENT OFFICE 1,985,278

UNIVERSAL JOINT

Merrill I. Bradley, Detroit, Mich.

Application November 4, 1932, Serial No. 641,273

15 Claims. (Cl. 64—91)

This invention relates to driving mechanisms and has particular relation to so-called universal joints particularly applicable for employment in the transmission mechanisms of automobiles.

An object of the invention is to provide a universal joint which will operate satisfactorily at comparatively wide angles and which can be employed in driving one shaft from another at constant velocity.

Another object of the invention is to provide means for positively maintaining the parts controlling a universal joint in their proper positions to prevent the assembled mechanism from becoming inoperative due to undesirable relative movement of such parts.

Another object of the invention is to provide a ball and socket joint, having a cage for holding a plurality of balls employed in the joint in operative relation and wherein the cage is provided with means by which it is retained in operative position relative to other parts of the mechanism under any operative conditions encountered.

Another object of the invention is to provide frictional means for positively moving a ball cage into its proper position, relative to other parts of a universal joint mechanism, when the shaft sections connected by such mechanism are operated at an angle relative to one another.

Another object of the invention is to provide a resilient cage operating mechanism for employment in universal joints having ball bearing means through which the force transmitted by the joint is operative.

Another object of the invention is to provide a more easily assembled, more efficient and more reliable universal joint than has heretofore been known.

Another object of the invention is to provide an improved and simplified ball cage element for employment in universal joints.

Another object of the invention is to provide means for positively moving a cage employed in universal joints at substantially one half the rate of angular movement of the ball member and socket embraced therein.

A further object is to provide a universal joint including two relatively angularly movable parts interlocked for the transmission of torque from one to the other through the medium of balls received partially in grooves in each member, the bottoms of the grooves being relieved against contact with the balls whereby to eliminate, to a great extent, the high radial loads imposed on the balls as occurs in similar constructions heretofore proposed.

The above being among the objects of the present invention, the same consists of certain features of construction and combinations of parts to be hereinafter described, and then claimed, with reference to the accompanying drawings.

In the accompanying drawings which show suitable embodiments of the present invention, and in which like numerals refer to like parts throughout the several different views:

Fig. 7 is a longitudinal sectional view illustrating another form of the invention and in which the cage is held in proper position between the ball member and socket by resilient mechanism mounted in the ball member located inside the cage.

Fig. 8 is a longitudinal sectional view illustrating another form of the invention in which the cage is moved in response to a plurality of balls resiliently held between the ball member and socket of a joint.

Fig. 9 is a cross-sectional view of the structure illustrated by Fig. 8 as the latter might appear substantially on line 9—9 of Fig. 8.

Fig. 10 is a longitudinal sectional view through a form of joint in which only torque transmitting balls are employed and in which the cage employed has a thrust bearing member resiliently held in position by a single large ball substantially equal in size to the torque transmitting balls.

Fig. 11 is a cross-sectional view taken substantially on the line 11—11 of Fig. 10.

Fig. 12 is a more-or-less diagrammatic view illustrating forces acting in conventional joint structures of the type involved herein.

Fig. 13 is a view similar to Fig. 12 but illustrating the corresponding forces acting in the joint of the present invention.

Figures 1, 2:
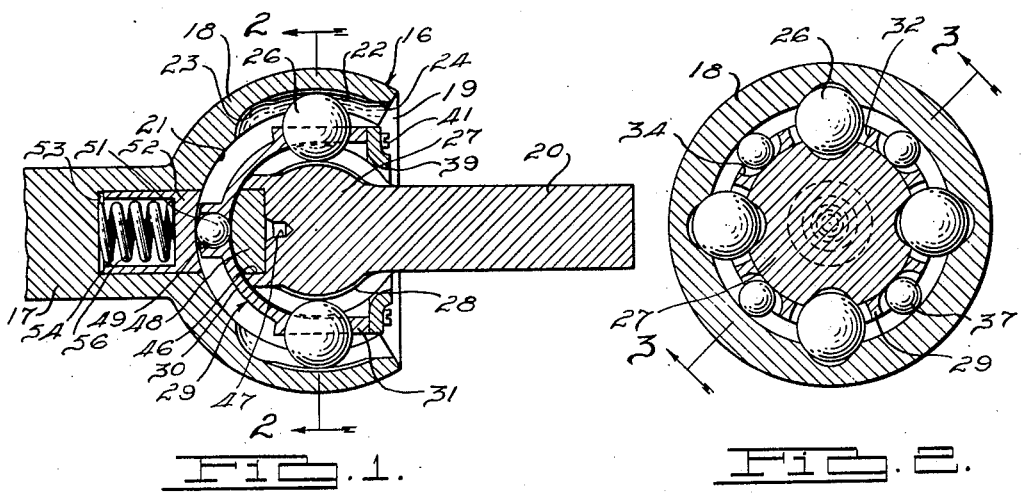
Fig. 1 is a longitudinal sectional view through a universal joint embracing the principles of the invention.
Fig. 2 is a transverse sectional view taken substantially on line 2—2 of Fig. 1.
Figures 3, 4:
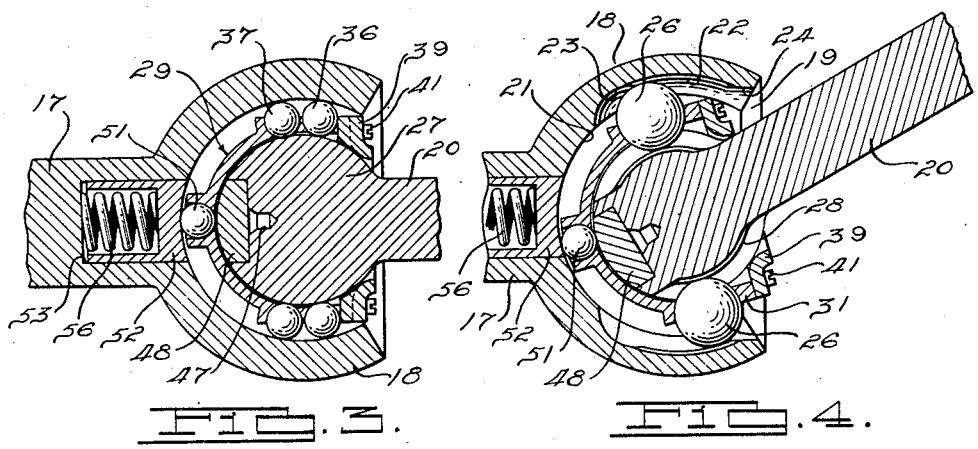
Fig. 3 is a longitudinal sectional view of the joint taken substantially in the plane of line 3—3 of Fig. 2.
Fig. 4 is a longitudinal sectional view similar to Fig. 1, except that the parts of the mechanism are in a different operative position.
Figures 5, 6:
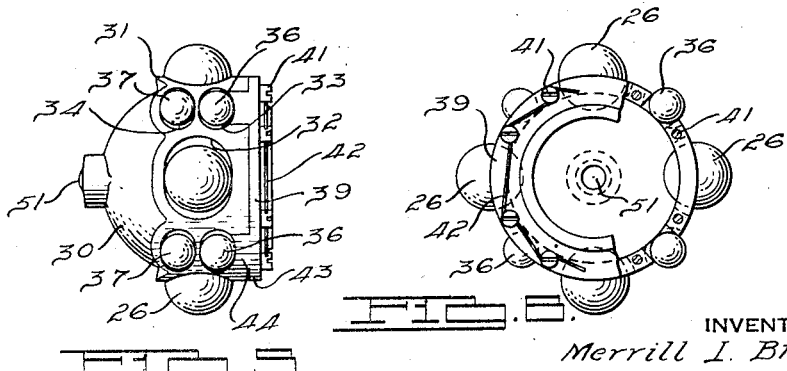
Fig. 5 is a side elevational view of a ball cage assembly employed in the structure disclosed by the preceding figures.
Fig. 6 is a front elevational view of the cage assembly illustrated by Fig. 5.

Referring particularly to Figs. 1 to 6, there is disclosed for the purpose of illustration a joint 16 by which shafts 17 and 20 normally are driven one by the other. The shaft 17, which in the present instance, is illustrated as somewhat larger than the shaft 20, has formed on one end thereof a socket 18 having a tapered opening 19 at the end thereof opposite the shaft 17, which communicates with a spherical opening 21 formed internally thereof. In the present instance the spherical opening 21 is modified by the formation therein of a plurality of arcuate grooves 22, each formed with the center of curvature thereof at the center of curvature of the spherical surface 21 and extending in parallel relation to the axis of the shaft 17. At the inner extremities thereof the arcuate grooves 22 are deepened slightly, as is indicated at 23, to facilitate the proper grinding of the major portions of the groove. Likewise, the outer limits of the grooves are relieved slightly, as is indicated at 24, for the same purpose. The grooves 22 are all formed arcuately in cross-sectional configuration in order to substantially fit outer portions of a plurality of torque transmitting balls 24, one of which is located in each of the grooves between the socket 18 and a ball member 27 located internally thereof. Arcuate grooves 28 also having their centers of curvature at the center of curvature of the surface 21 and of the ball member 27 are formed around the exterior surface of the latter in parallel relation to the axis of the shaft 20. The length of the arcuate slots 22 and 28 is such that the shafts 17 and 20 may be moved, in the particular joint illustrated, into a position at substantially 40 degrees relative to one another without interfering with the free rolling movement of the balls 26 therein.

In order to hold the balls 26 in proper position between the ball member 27 and the socket 18, there is provided within the socket 18 a cup shaped member or cage 29 having a substantially semispherical end portion 30 inside of which the end of the ball member 27 is adapted to oscillate freely but without engagement therewith. The sides of this cage are formed to provide a cylindrical portion 31 of somewhat greater thickness than the rest of the cage and which is adapted to rotate about an axis passing through the center of curvature of the ball member 27 and the socket 18 and bisecting whatever angles may exist between the shafts 17 and 20.

Formed in this portion are a plurality of openings 32, each formed substantially to fit the balls 26 longitudinally of the cage 29 but sufficiently large to provide for a slight amount of lateral movement of the balls circumferentially of the cage. All of these openings are bisected by a plane normal to the axis of the cage 29 and intersecting the center of the ball member 29 and the socket 18. Formed intermediate the openings 32 for the balls 26 are pairs of openings 33 and 34 and which, like the openings 32 are somewhat longer circumferentially of the cage 29 than longitudinally thereof. These openings are so located that the two openings of each pair are equidistant from the aforesaid plane bisecting the openings 32. In these slots are located groups of thrust resisting balls 36 and 37, the former preventing the cage 29 from moving outwardly of the socket 18, while the latter prevents the cage from moving farther inwardly of the socket. The balls however do not prevent the rotation of the cage around the center of the socket. The balls 36 and 37 may be appreciably smaller than the balls 26, as indicated, although the centers of all the balls, regardless of their relative sizes, are equidistant from the center of the socket 18. Inside the openings 33 and 34 the balls 36 and 37 engage the outer surface of the ball member 27 while externally thereof they engage the interior surface 21 of the socket 18. At no time do the balls 36 and 37 enter any of the grooves 22 or 28 formed in the socket 18 and ball member respectively.

After the mechanism is entirely assembled the cage and balls therein are held in position by a cap 39 which is maintained upon the outer extremity of the cage by screws indicated at 41. A wire 42 is employed through openings in the heads of the screws 41 to prevent the screws from becoming loosened during the operation of the device. The major portion of the cap 39 is formed in the shape of a plate indicated at 43 and from the rear surface of which projects a plurality of arcuate and integral bosses 44 which fill openings formed longitudinally of the cage 29 between the openings 32 and the outer extremity of the cage. These openings are provided for inserting the balls 36 and are filled by the lugs 44 when the cap 39 is in position to complete the formation of the cage.

On the end of the ball member 27 opposite the shaft 20 there is provided a cylindrical opening indicated at 46 and a central opening 47, both of which have axes coincidental with the axis of the shaft 20. The opening 47 is provided as a center opening for convenience in mounting the shaft 18 during the formation and grinding of the ball member 27. The opening 46 normally is closed by a removable cylindrical plug 48, the outer surface of which is ground to provide a continuation of the outer surface of the ball member 27. Formed in the cage 29 just beyond the plug 48, when the shafts 20 and 17 are aligned, and coincidental with the longitudinal axis of the cage is a ball opening 49 in which is mounted a ball 51, which may be of any desired size, but for the purpose of illustration is shown as of substantially identical to any of the balls 36 and 37, and adapted for operation with its center the same distance from the center of the ball member 27 as are the centers of the balls 26, 36 and 37. Inside the opening 49, the ball 51 engages the exterior surface of the plug 48 while externally of such opening, it engages the arcuate inner surface of a follower member 52 which is mounted in a cylindrical blind opening 53 in the base of the socket 18 and having a central axis coincidental with the central axis of the shaft 17. The follower 52 is provided with a blind recess 53 formed in the rear thereof for receiving a spring 56, one end of which engages the bottom of the opening 53, while the opposite end engages the blind end of the recess 53 in the follower member 52. It will be apparent that the spring 56 will hold the follower member forwardly in the opening 53 and, with a substantially constant force equal to the degree of compression of the spring, will confine the ball 51 between the arcuate inner surface of the follower member and the arcuate exterior surface of the ball member 27.

During the operation of the joint the cage 29 may not engage either the socket 18 or the ball member 27 but may be suspended between the two by the balls 26, 36, 37 and 51. The balls 26 normally do not tend to hold the ball member within the socket member 18 but merely transmit the torque from one member to another while rolling longitudinally within the grooves 22 and 38 during the angular movement of one of the shafts 17 or 18. The balls 36 and 37 are free to roll upon the exterior surface of the ball member 27 and the interior surface of the socket 18 and consequently have nothing to do with transmitting the torque between these two members. However, since these balls are arranged in two groups in planes on opposite sides of the center of the ball member 27 and socket 18 the outer group of balls 36 will prevent the ball member 27 from being pulled out of the socket 18 while the inner group 37 prevents the ball member from being urged inwardly of the socket beyond its normal operative position. These balls also normally provide a portion of the bearing surface between the ball member 27 and socket 18 and assist in supporting the cage between these two members.

Assuming the balls 36, 37 and 26 all to fit tightly between the ball member 27 and the socket 18 the frictional force exerted upon the balls during the movement of one of the shafts 17 or 20 relative to the other will cause the balls to roll and in rolling will move the centers of the balls a distance equal to one half the angular distance between normally oppositely disposed points on the exterior surface of the ball member and the interior surface of socket 18. Such movement of the balls will also move the cage 29 to the same extent under normal conditions of operation. However, since it would be very difficult, if not practically impossible, to build a structure in which all of the balls 26, 36 and 37 would be pressed with an equal force between the ball member 27 and the socket 18 at all angular positions of the shafts 17 and 20, it has been deemed advisable to provide means for confining at least one group of the balls between the ball members 27 and the socket member 18. This means is embraced in the ball 51 and the resiliently mounted follower member 52, the latter of which transmits the substantially constant force resulting from the compression of the spring 56 through the ball 51 to the ball members 27, and is there employed in firmly holding the group of balls 36 against slipping or sliding between the ball member 27 and the socket 18. This substantially constant force is practically independent of the torque transmitted by the joint through the balls 26. With this mechanism for insuring against the slipping of the balls 36 the latter will roll uniformly between the surfaces of the ball member 27 and the socket 18 and consequently will always maintain the cage 29 in a uniform position relative to the ball member and socket 18 at any position of operation of the two shafts 17 and 20.

When assembling the joint the follower 52 is first placed in the opening 53 upon the spring 56 and the cage 29 with the balls 26, 36 and 51 in position but without the cap 39 attached, is placed within the socket 18. The ball member 27 then is inserted within the cage and the balls 36 are inserted through the slots in the cage into the openings 32. To retain the elements in this assembled position the cap 39 is then placed over the opening in the cage with the lugs 44 occupying the cage slots through which the balls 36 were inserted. The cap is secured in position by inserting the screws 41 and locking them in position by application of the wire 42.

The structure illustrated by Fig. 7 is very similar to that illustrated by Figs. 1 to 6 and wherever applicable the same reference numerals are applied to corresponding parts of the structure. One of the differences between the structures however, is in the location of the plug 48 and the follower member 52. In the structure illustrated by Fig. 7, the plug is located in a cylindrical opening in the part containing the central portion of the socket 18 rather than in the ball member 27 as is illustrated by Figs. 1 to 6. There is provided in this structure at the inner extremity of the opening for receiving the plug 48 a center opening 57 which may be found convenient to employ in finishing the opening for the plug 48 and the interior of the socket 18. Also in Fig. 7, the follower 52 and spring 56 is located in an opening 58 formed axially of the shaft 57 and at the end of the ball member 27 rather than in the socket part of the mechanism as is illustrated by Figs. 1 to 6. At the bottom of the opening 58 there is also provided a center opening 59 which may be employed in grinding the ball member 27. In this structure instead of employing the cap 39 for preventing the escape of the balls 36 and in general for holding the device in assembled relation there is employed, in a groove formed around the inner surface of the cage 29 just beyond the balls 36, a split annular ring 61 which may be snapped into position after the insertion of the balls 36 and during the final step of assembling the joint. This ring, when in position, will be engaged by the balls 36 for holding the latter in position within the openings 33.

In the structures illustrated by Figs. 8 and 9, where corresponding parts of the joint are indicated by the same reference numerals employed in Figs. 1 to 6, there is employed instead of the resiliently mounted ball 51, embraced in the structure disclosed by these figures, a plurality of balls, preferably four in number, as is indicated at 62, and each of which is located in a separate opening 63 formed in the cage 29 and at equal distance from the central axis of the cage. The balls 62 preferably are somewhat smaller than the ball 51 employed in the structure disclosed by Figs. 1 to 6 although all of the balls have their centers located upon the same pitch line. To provide for seating the balls 62 upon the ball member 27, due to the decreased diameter of the former as compared with the balls 36 and 37, the inner surface of the cage 29 is provided with an arcuate recess 64, in which an enlarged plug 66 is adapted to project into engagement with the balls. The balls 62 are held against the plug 66 by a follower 67 having a cylindrical stem 68 slidably disposed in a reduced portion 69 of a cylindrical opening 71 in which the follower is mounted. A spring 72 for resiliently supporting the follower is mounted between the inner extremity of the latter and a shoulder 73 formed between the reduced portion 69 of the opening 71 and the larger portion thereof. In other respects the joint disclosed by Figs. 8 and 9 is substantially the same as the joint disclosed by Figs. 1 to 6 and is both assembled and operated in a like manner.

In the joint disclosed by Figs. 10 and 11 there is employed a cage 81 which serves as a bearing member between the inner surface of the socket 18 and the exterior surface of the ball member 27. In this structure, however, both the socket 18 and the ball member 27 are considerably modified to permit the cage to serve such purpose. In view of the fact that the cage acts as a bearing member between the said relatively movable parts, it is unnecessary to employ balls such as those indicated at 36 and 37 in the structures disclosed by the preceding figures because when once assembled in this relation the cage also prevents displacement of the ball member from within the socket and otherwise limits the movement between the two elements. The cage, however, is provided with elongated openings 76 for receiving torque transmitting balls 77 arranged equally distant around the portion of largest diameter of the cage 81 and these balls operate within longitudinal grooves 78 and 79 formed in the interior and exterior surfaces of the socket 18 and ball member 27. At the end thereof opposite the shaft 18 the ball member 27 is cut off as is indicated at 81 to provide a spherical segment of surface indicated at 82 which forms a continuation of the extreme inner surfaces at the bottom of the grooves 79. A part of this surface is formed by a plug 83 inserted in a shallow cylindrical opening in the end of the ball member 27 while the remainder of the surface of the ball member is formed on a splined collar 84 secured on the end of the shaft 18 by a ring 86 fastened into the end of the collar by screws 87. On the spherical end surface 82 of the ball member 27 there is disposed a ball 88 which may be of any desired size, but which as shown is substantially equal in size to the balls 77, or in any event mounted on the same pitch circle therewith, and which is held in position within an opening 89 formed upon the longitudinal axis of the cage. Beyond the cage this ball is engaged by a follower member 91 resiliently mounted in an axial opening 92 formed in the shaft 17 and upon a spring 93 located therein. The ball engaging surface of the follower 91 is of spherical formation with its radius of curvature equal to the radii of curvature of the arcuate slots 78. Around the outer end of the follower member the inner surface of the socket 18 is relieved as is indicated at 94 to provide an annular groove for accommodating the oscillating movement of the ball 88.

The device may be assembled in any desired manner as for example by forming the cage 81 with a separable end portion 74 which will permit the main portion of the cage to be so shifted as to receive the balls 77 from beyond the edge of the socket 18. By employing such expedient, it will be apparent that the points of contact between the balls 77 and the ball member 27 and socket 18 will be more nearly opposite one another than they would were the balls to engage the bottoms of the groove. Consequently, there is less tendency for the sockets to spread radially due to the extreme radial component of force which would result from transmission of the force between the ball and socket member through inner and outer points upon the balls.

In the operation of this structure, it will be apparent that the follower member 91 will maintain the ball 88 always in frictional engagement with the spherical end surface of the ball member 27 and the movement of the ball resulting from the angular movement of the two shafts 17 and 20 will move the cage half as far as the socket 18 and ball member 27 are moved relative to one another.

In the general type of universal joints including torque transmitting balls as in the constructions above described, it will be apparent that in transmitting torque between the two major elements thereof, there is a tendency for the balls to roll up the sides of the grooves, as will be particularly apparent from a sectional view of the joint, for instance as in Figs. 2, 9 and 11. This tendency of the balls to roll up the sides of the grooves creates a pressure acting through the center of each ball and through points, or at least relatively small lines, of contact of each ball slightly offset circumferentially from the center of each ball groove, as diagrammatically illustrated in Fig. 12 along the line $a$. Now employing the length of the line $a$ from the center of the ball $b$ as being proportional to the amount of force exerted along it, the radial component of such force would be proportional to the length of the lines $c$ in a force diagram, and the amount of the force $a$ acting through the center of the ball $b$ in a direction perpendicular to the force $c$, or in a direction tangent to the inner ball member of the joint centrally of the ball groove, would be proportional to the line $d$. Obviously the force $d$ is the effective turning effort applied through each ball $b$ during transmission of power through the joint.

It has been proven in actual practice that the angle between the lines $a$—$c$ in such joints as have heretofore been suggested is usually between five and seven degrees and, as a result, the magnitude of the force is many times that of the force $d$. In fact, it has been found that the force $a$ is so great as to actually cause peening of the metal at the bottom of the ball grooves, and that failures of most of such joints is caused by the force $a$ becoming so large as to cause a bursting of the outer socket member of the joint.

In accordance with a further object of the invention I provide a joint of this type in which these unduly large forces tending to burst the socket member is reduced to such an extent as to be relatively insignificant. The manner in which this is accomplished is to relieve the bottoms of the ball grooves in the interior and exterior surfaces of the socket and ball members, as at 98 and 99 respectively, from contact with the balls over a material distance, thus limiting contact between the torque transmitting balls and their grooves to the outer areas only of the grooves, which not only insures a relatively long line of contact between each ball and its corresponding groove, but decreases the radial component of the force being transmitted through the balls to a relatively modest figure. This is illustrated in Fig. 13 in which the corresponding elements and forces are indicated by the same letters as in Fig. 12 but which letters are primed. It will be noted that the angle between the forces $a'$ $c'$ is greatly increased over the angle $a$ $c$ in Fig. 12, in fact to approximately forty-five degrees and, because of the fact that the amount of the forces $d$ and $d'$ will remain the same in each case, that the forces $a'$ and $c'$ will be considerably smaller than the forces $a$ and $c$ in Fig. 12.

From the above it will be apparent that by the expedient of relieving the bottoms of the torque transmitting ball grooves, a much more efficient and improved joint results.

It will be apparent that, during the operation of any joint disclosed herein, either shaft may be driven from the other at a uniform velocity and that the ball cage will be positively maintained in its proper operative position regardless of the angle at which the shafts are disposed.

While the structure disclosed herein represents a preferred form and application of the invention, it is to be understood that there are numerous other forms and applications thereof which will be apparent to those skilled in the art and all of which are within the scope of the invention as the latter is set forth in the appended claims.

I claim:—

1. A universal joint comprising a pair of shaft sections having a socket and an internally disposed ball at the adjacent ends thereof, a cage between said ball member and socket, said cage comprising cylindrical and semi-spherical portions, a plurality of balls mounted in openings formed in said cylindrical portion, said balls being mounted for rotation in longitudinal slots formed in the adjacent surfaces of said socket and ball member, and a ball mounted in an axial opening formed in said cage for maintaining the latter in operative position relative to said ball member and socket.

2. A universal joint comprising a pair of shaft sections having a socket and internally disposed ball formed upon the adjacent ends thereof, a cage between said socket and ball member, said cage having a plurality of balls extending through openings therein around the periphery thereof and disposed in longitudinal slots formed in said socket and ball member, a group of balls mounted in openings of said cage on opposite sides of the centers of said first mentioned balls and adapted for operation upon the adjacent surfaces of said ball member and socket, all of said openings being elongated circumferentially of said cage and means for securing said balls in position within said cage.

3. A universal joint comprising a pair of shafts having a socket and an internally disposed ball member formed upon the adjacent ends thereof, a cage having a semi-spherical portion and a cylindrical portion disposed within said socket and surrounding said ball member, a cap for partially closing the open end of said cage but provided with an opening for receiving one of said shafts therein, a plurality of balls mounted in openings formed in said cage, and disposed between the adjacent surfaces of said ball member and socket, means associated with said cap for securing said balls in operative position and additional balls received between opposed pairs of grooves in said socket and ball member respectively.

4. A universal joint comprising a pair of shafts having a socket and an internally disposed ball member formed upon the adjacent ends thereof, a cage between said ball member and socket, balls received in opposed grooves in said socket and ball member for operating one of said shafts in unison with the other, a plurality of additional balls mounted in said cage and disposed between the adjacent surfaces of said ball member and socket, and a split ring disposed in a groove inside said cage for limiting the movable positions of said balls.

5. A universal joint comprising a pair of shafts having a socket and an internally disposed ball formed upon the adjacent ends thereof, a cage disposed between said ball member and socket, balls received in opposed grooves in said socket and ball member for operating said elements in unison with one another, another ball disposed in an opening formed in said cage for rotatable operation between said ball member and socket, and a follower member resiliently mounted in one of said elements for maintaining said other ball in frictional engagement with the other.

6. A universal joint comprising a pair of shafts having a socket and an internally disposed ball member formed upon the adjacent ends thereof, a cage mounted between said ball member and socket, balls received in opposed grooves in said socket and ball member for operating said elements in unison, another ball rotatably mounted in said cage and adapted for frictional engagement with one of the elements, a cylindrical opening formed in the other of said elements, a resilient follower member mounted in said cylindrical opening and a spring behind said follower member for holding the latter in frictional engagement with said other ball.

7. A universal joint comprising a pair of shaft sections having a socket and an internally disposed ball member formed upon the adjacent ends thereof, a cage disposed between said ball member and said socket and provided with a plurality of openings therein, a plurality of balls disposed in said openings and projecting into said ball member and socket in arcuate grooves formed longitudinally of said elements, said grooves affording line contact with said balls and being relieved at the bottom portions thereof to provide engagement with said ball member and socket along the sides only of said balls whereby to reduce the tendency of said balls to climb the sides of said grooves under the transmission of torque through said joint.

8. A universal joint comprising a pair of shafts having a socket and an internally disposed ball formed upon the adjacent ends thereof, a cage mounted between said ball member and socket and provided with a plurality of peripheral openings therein, a plurality of balls mounted in said openings and projecting therebeyond into grooves formed longitudinally of said ball member and socket, said grooves affording line contact with said balls and being of greater depth than the width thereof to provide engagement with said ball member and socket along the sides only of said balls whereby to reduce the tendency of said balls to climb the sides of said grooves when subjected to the effect of torque being transmitted through said joint.

9. A universal joint comprising a pair of shaft sections having a socket and an internally disposed ball member mounted upon the adjacent ends thereof, said socket and said ball member having opposed raceways in their opposed faces, a ball engaged between each pair of said opposed raceways, a cage between said socket and ball member encircling said ball, and means independent of said ball frictionally engaged between said ball member and socket for controlling the position of said cage during the operation of said joint.

10. A universal joint comprising a pair of shaft sections having a socket and an internally disposed ball member upon the adjacent ends thereof, said socket and ball member having opposed raceways formed in their opposed faces, a ball engaged between each opposed pair of said raceways, a cage between said socket and ball member encircling said balls, means adapted for frictional engagement between said ball member and said socket independently of said balls for controlling the position of said cage, and means independent of the load on said joint for applying a constant pressure on said means to effect the operation thereof.

11. A universal joint comprising a pair of shaft sections having a socket and an internally disposed ball member upon the adjacent ends thereof, said socket and ball member having opposed grooves formed in the opposed surfaces thereof, a ball received between each pair of said opposed grooves, a cage between said ball member and socket cooperable with said balls to maintain the relative positions thereof, another ball rotatably mounted in said cage between said ball member and said socket, and means for resiliently confining said other ball between said ball member and socket for controlling the operative position of said cage.

12. A universal joint comprising a pair of shaft sections having a socket and an internally disposed ball member mounted upon the adjacent ends thereof, said socket and ball member having opposed grooves therein, a ball between each pair of said opposed grooves, a cage between said ball member and socket surrounding said ball, another ball mounted in said cage between said ball member and said socket independently of said grooves, and means independent of the load on said joint for frictionally confining said other ball between said ball member and socket.

13. A universal joint comprising a pair of shaft sections having a socket member and an internally mounted ball member upon the adjacent ends thereof, a cage between said ball member and said socket member, said ball member and socket member having opposed grooves formed in the opposed surfaces thereof, a ball received between each pair of opposed grooves and projecting through said cage, and another ball mounted in an opening formed axially of said cage and in alignment with the axes of said shafts when one of said shaft axes is in alignment with the other thereof forming a frictional speed reducing drive between said cage and one of said members.

14. A universal joint comprising a pair of shaft sections having a socket member and an internally disposed ball member mounted upon the adjacent ends thereof, a cage disposed between said ball member and socket member, said socket member and said ball member having opposed grooves formed in opposed surfaces thereof, a ball received between each opposed pairs of said grooves and projecting through said cage, a ball mounted in said cage between said ball member and socket and in alignment with the aligned axes of said shaft, and means maintaining the last mentioned ball in frictional engagement with one of said members whereby to effect a frictional speed reducing drive between said cage and said one of said members.

15. A universal joint comprising a pair of shaft sections having a ball member and a socket on the adjacent ends thereof, said ball member being disposed within said socket, said ball member and said socket having opposed grooves formed in opposed surfaces thereof, a cage disposed between said ball member and said socket, a ball received between each pair of opposed grooves and projecting through said cage, said cage having a semi-spherical end portion provided with an opening formed axially of said cage, and a ball mounted in said opening and held resiliently in engagement with said ball member and socket.

MERRILL I. BRADLEY.